United States Patent Office.

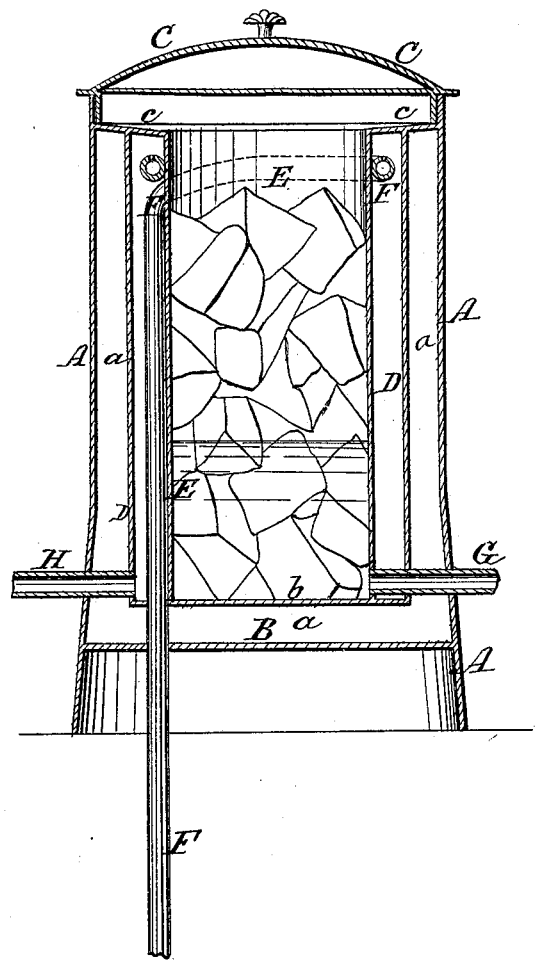

JUDSON VAN DUZER, OF OTISVILLE, NEW YORK.

*Letters Patent No. 88,098, dated March 23, 1869.*

IMPROVED DOUBLE COOLER.

The Schedule referred to in these Letters Patent and making part of the same.

*To all whom it may concern:*

Be it known that I, JUDSON VAN DUZER, of Otisville, in the county of Orange, and State of New York, have invented a new and improved Double Cooler; and I do hereby declare that the following is a full, clear, and exact description thereof, which will enable others skilled in the art to make and use the same, reference being had to the accompanying drawings, forming part of this specification, in which the drawing represents a sectional elevation of my improved double cooler.

This invention relates to a new cooler, which can be used for two kinds of liquids at once, so that, for example, beer and water, or any other two kinds of liquor, can at the same time be cooled therein.

The invention consists in arranging around the main cylindrical ice-and-water receptacle, and within the outer shell, an annular vessel, which is to contain the second kind of liquid, so as to keep it cool and fresh. A pipe extends from each one of the vessels, through the shell, and is provided with a stop-cock or faucet, so that the respective liquids can be drawn off at will. The liquid for the annular vessel is carried into the same in a pipe, which surrounds the inner cooling-vessel, and which discharges its contents in the upper part of the cooler, so that the liquid in it will twice pass along the cooling-surface of the inner vessel—once during its passage through the feed-pipe, and again while it passes from the upper to the lower part of the annular vessel.

A, in the drawing, represents the cylindrical or other shell of a cooler, or liquid-refrigerator.

B is the bottom.

C is the cover.

The vessel A is, on its inner side and bottom, thoroughly lined with charcoal or other non-conducting material, and in the same manner is the cover C filled with similar substance.

Within the vessel A, and close to the lining $a$ of the same, is fitted another vessel, D, which contains another vessel, E, that rests on its bottom, $b$, as shown. The vessel D is thus of annular shape, it surrounding the vessel E, and being surrounded by the shell A, as is clearly shown in the drawing.

The cover C closes all the vessels, as shown.

A flange, $c$, may be formed on the upper part of the vessel A, to keep D continually covered.

F is a pipe, entering the annular vessel D through its bottom, $b$, and extending nearly to the top, it being wound around the vessel E, as indicated in the drawing.

G is a pipe, extending from the lower part of E, through the sides of D and E, to the outside; and H, another pipe, extending from the lower part of the vessel D to the outside.

The vessel E is filled with ice and water, so that the latter can be drawn off through the pipe G. The other liquid which is to be cooled, passes through the pipe F, and is cooled in the same, as the pipe is in immediate contact with the cold side of the vessel E.

The liquid is discharged from F, through apertures arranged near the upper end of the same, and is still more cooled by the cold vessel E, before it can be drawn off through H.

Having thus described my invention,

I claim as new, and desire to secure by Letters Patent—

A cooler, in which at once, two kinds of liquids can be cooled, as set forth, it consisting of the vessels E, D, and A, arranged, one within the other, in combination with the pipe F, substantially as described, all operating as specified.

JUDSON VAN DUZER.

Witnesses:
JAMES EASTON,
WALTER MOORE.